(12) United States Patent
Berger et al.

(10) Patent No.: US 8,218,860 B1
(45) Date of Patent: Jul. 10, 2012

(54) METHOD AND SYSTEM FOR REPLACING COLOR RANGES IN AN IMAGE

(75) Inventors: Ralf Berger, Acton, MA (US); Steve M. Troppoli, Carlisle, MA (US)

(73) Assignee: Adobe Systems Incorporated, San Jose, CA (US)

( * ) Notice: Subject to any disclaimer, the term of this patent is extended or adjusted under 35 U.S.C. 154(b) by 986 days.

(21) Appl. No.: 12/230,000

(22) Filed: Aug. 28, 2008

(51) Int. Cl.
*G06K 9/00* (2006.01)
(52) U.S. Cl. ......... 382/162; 382/167; 382/168; 382/169
(58) Field of Classification Search .................. None
See application file for complete search history.

(56) References Cited

U.S. PATENT DOCUMENTS

| | | | |
|---|---|---|---|
| 5,317,678 A | 5/1994 | Okawara et al. | |
| 5,719,639 A | 2/1998 | Imamura | |
| 6,128,001 A | 10/2000 | Gonsalves et al. | |
| 6,873,441 B1* | 3/2005 | Kuwabara et al. | 358/3.26 |
| 6,947,078 B1* | 9/2005 | Kuwata et al. | 348/223.1 |
| 6,963,663 B1* | 11/2005 | Yoshida | 382/167 |
| 7,437,016 B2* | 10/2008 | Gutenev | 382/274 |
| 2003/0021478 A1* | 1/2003 | Yoshida | 382/195 |
| 2003/0044061 A1* | 3/2003 | Prempraneerach et al. | 382/164 |
| 2004/0151370 A1* | 8/2004 | Sasaki | 382/162 |
| 2005/0244072 A1* | 11/2005 | Imai | 382/254 |
| 2006/0061842 A1* | 3/2006 | Oka et al. | 358/522 |
| 2007/0076277 A1* | 4/2007 | Miyawaki et al. | 358/520 |
| 2009/0041343 A1* | 2/2009 | Itoh | 382/162 |
| 2009/0220120 A1* | 9/2009 | Yen et al. | 382/100 |

OTHER PUBLICATIONS

Herodotou et al. "Automatic location and tracking of the facial region in color video sequences", Signal processing: Image communication 14, 1999, 359-388.*

* cited by examiner

*Primary Examiner* — Li Liu
(74) *Attorney, Agent, or Firm* — Robert C. Kowert; Meyertons, Hood, Kivlin, Kowert & Goetzel, P.C.

(57) ABSTRACT

An image-editing application may be configured to transform a color hue value range in an image to a replacement color hue value range. The image-editing application may create a hue histogram of the image. The hue histogram may include tabulated frequencies of color hue values included in the image. The image-editing application may search for prominent peaks in the histogram. For a prominent peak, the image-editing application may determine a corresponding range of color hue values. Subsequently, the image-editing application may determine a range of replacement color hue values. The image-editing application may replace the prominent color hue values with the replacement color hue values. When the image is displayed on a display device, the pixels associated with the prominent color hue values will display the replacement color values.

33 Claims, 7 Drawing Sheets
(3 of 7 Drawing Sheet(s) Filed in Color)

METHOD AND SYSTEM FOR REPLACING COLOR RANGES IN AN IMAGE

BACKGROUND

Digital images may be represented in a grid arrangement, where each position within the grid is called a pixel. A color image pixel may be represented by numeric Red, Green, Blue (RGB) values that correspond to a particular color. There are several different binary digital representations of RGB values, but the main characteristic of all of them is representing the values as integer numbers within some range, usually from 0 to a number equivalent to a power of two minus one (e.g., $2^n-1$) in order to fit them into bit groupings. The values may be represented in either decimal or hexadecimal notation. For example, RGB values encoded in 24 bits-per-pixel may be specified using three 8-bit unsigned integers (0 through 255) representing intensities of red, green and blue. The composite of the three eight bit numbers is the final representation associated to each pixel and defines the color of the pixel. For example, a black pixel has the composite value of (0, 0, 0), meaning red=0, green=0, blue=0. A white pixel has the composite value of (255, 255, 255). A yellow pixel has the composite value of (255, 255, 0).

The colors of pixels in an image may be defined using color space representations other than RGB, such as Hue, Saturation and Lightness (HSL) or Hue, Saturation and Value (HSV). Hue is one of the three main attributes of perceived color, in addition to lightness and chroma (i.e., colorfulness). Usually, colors with the same hue are distinguished with adjectives referring to their lightness and/or chroma, such as "light blue", "pastel blue", "vivid blue". Exceptions include brown, which is a dark orange, and pink, which is a light red with reduced chroma. Saturation is the colorfulness of a stimulus relative to its own brightness. A highly colorful stimulus is vivid and intense, while a less colorful stimulus appears more muted, closer to gray. With the three attributes—colorfulness (e.g., chroma or saturation), lightness (or brightness), and hue—any color can be described.

Image-editing is the process of altering, manipulating, enhancing and transforming digital images. Image-editing software may be broadly grouped into vector graphics editors, raster graphics editors and 3d modelers. Image-editing programs may be used to render or create digital images.

Image-editing applications, such as Adobe Photoshop™, may change the pixel information in order to enhance the image. Pixels may be changed as a group or individually by transformation operations executed by the image-editing application.

SUMMARY

Various embodiments of methods and systems for transforming color hue value ranges in a digital image are disclosed. An image-editing application may create a histogram of an image. The histogram may include tabulated frequencies of color hue values within the image.

The image-editing application may determine a prominent color hue value range within the image according to the histogram. The prominent color hue value range may be associated with a particular group of pixels displayed on a display device.

The image-editing application may determine a replacement color hue value range corresponding to the prominent color hue value range within the image.

The image-editing application may replace the prominent color hue value range in the image with the replacement color hue value range. The color hue value for each pixel within the particular group of pixels may be changed from a prominent color hue value within the prominent color hue value range to a corresponding replacement color hue value within the replacement color hue value range.

BRIEF DESCRIPTION OF THE DRAWINGS

The patent or application file contains at least one drawing executed in color. Copies of this patent or patent application publication with color drawings(s) will be provided by the Office upon request and payment of the necessary fee.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the invention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in the permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A method and system for replacing color hue value ranges in a digital image is described herein. Due to the popularity of digital cameras, image-editing applications are widely used to perform operations on digital images, such as rotating, cropping and selectively changing colors. An image-editing application is defined as a program, or collection of program components running on one or more computing devices that enable a user to manipulate visual images. Image-editing applications may be configured to pick certain colors or color ranges in an image and render the image with replacement colors. For example, a user associated with an image-editing application may select a replacement color range and the image-editing application replaces the original color range in the image with the replacement color range.

An image-editing application may initially receive a digital image. For example, the image may be retrieved via a network from an image data store on network-based server. The image-editing application may be a network-based application and a network-based server may be implemented as a web server or host web services to store image files for users in an image data store. In other embodiments, the image-editing application may be a desktop application and the image may be stored locally on the computer executing the image-editing application.

Once the image-editing application receives the image, the image may be displayed on a display device. (See the description for FIG. 5 for more information about displaying the image.) A user associated with the image-editing application may choose to change a color range within the image to another color range and the image-editing application may replace the selected color range with the replacement color range.

Figure 1:
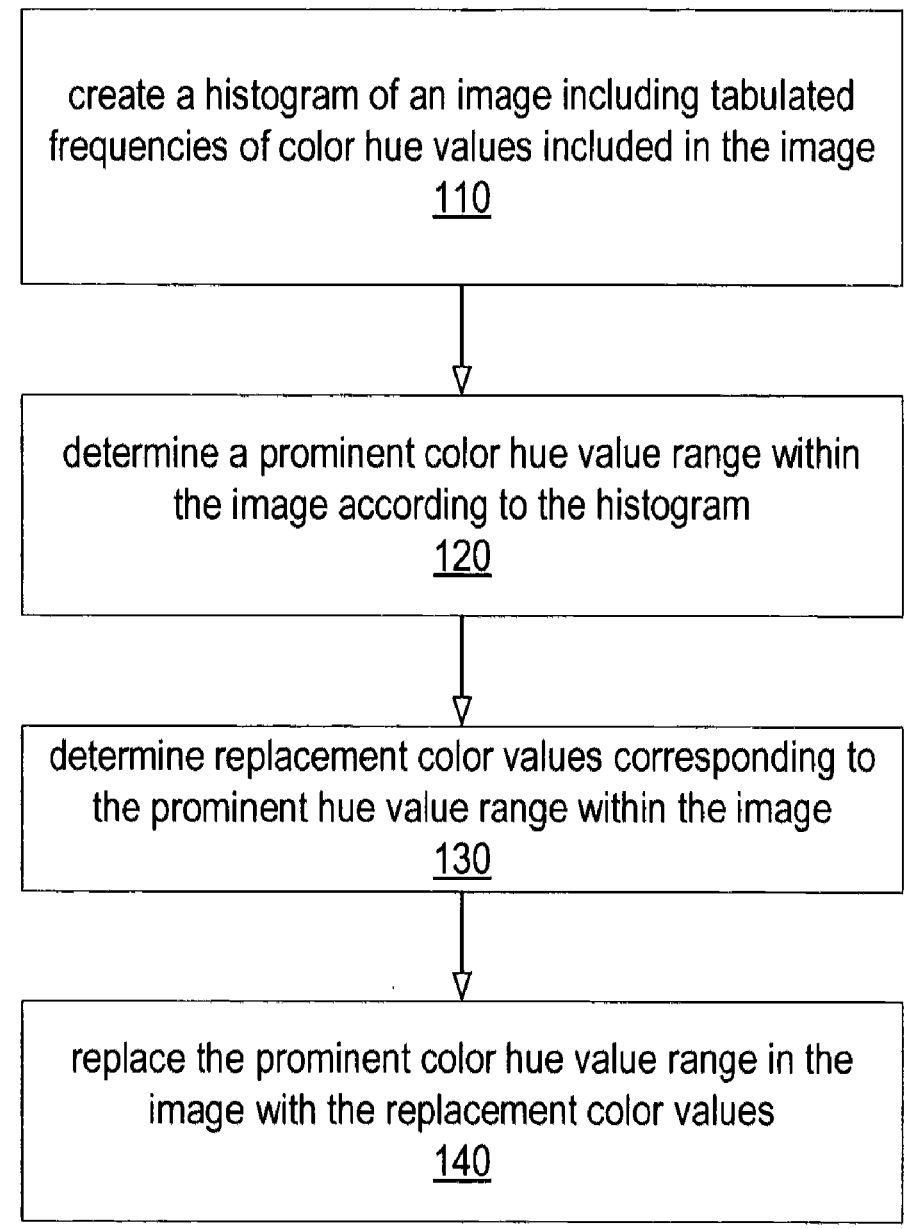
FIG. 1 is a flow diagram illustrating an image-editing application, according to some embodiments.

FIG. 1 is a flow diagram illustrating an image-editing application replacing a color range in an image with a replacement color range, according to some embodiments. As shown in block 110, an image-editing application may create a histogram of the image. The histogram may include tabulated frequencies of color hue values included in the image. In some embodiments, the image-editing application may initially downsample the image to reduce the size of the data in order to improve processing performance. The histogram may be created from the downsampled image of the original image.

If the image information is defined in a color space that does not include a hue component, the image-editing application may convert the image to a format that includes a hue value. For example, the image-editing application may convert the image from an RGB format to an HSV format.

After downsampling and converting the image to a color space that includes a hue value (e.g., HSV) the image-editing application may create a hue histogram of the image. The hue histogram characterizes the image by its color distribution and may be constructed by counting the number of pixels for each color hue value bucket define for the histogram. The granularity (i.e., number of hue value buckets) of the histogram may vary for different embodiments and may be configurable in some embodiments.

In some embodiments, the image-editing application may weight and/or disregard certain values when creating the histogram. For example, muted versions of a color may not be interesting as bright versions. The muted versions may be disregarded and the bright hue values may be emphasized, giving them "more weight" in the final effect. Any suitable weighting technique may be used.

After creating the histogram, in some embodiments the image-editing application may alter the histogram in order to make the peaks and valleys more distinct. Many techniques may be used to smooth the peaks and valleys of the histogram. For example, the histogram may be transformed with a Gaussian kernel. In other embodiments, the image-editing application may not alter the histogram using a smoothing technique.

The image-editing application may determine a prominent color hue value range within the image, according to the histogram, as shown in block 120. Prominent color hue value ranges are typically represented by a peak associated with a bell curve within the histogram. To determine a color hue value range, the image-editing application may determine a peak in the histogram and walk down one slope of the curve to a certain threshold. The image-editing application may then start at the peak again and walk down the other slope to a second threshold. The range of values between the two thresholds may determine the prominent color hue value range.

Many techniques may be utilized to determine one or more thresholds for determining peak end points. For example, in one embodiment, the image-editing application may calculate the mean, variance and standard deviation of the distribution associated with a peak. In one case, an outlier threshold may be defined as some number of standard deviations (e.g., 2.5 standard deviations). A peak endpoint may be defined when the outlier threshold is reached in the histogram. In another case, one or more thresholds may be defined to detect the start of a slope up to another peak of a certain size. In this case, the end point of the current peak may be defined as the start of the new peak. A combination of such thresholds may be used by a peak detection process to identify peaks by traversing the histogram. For example, a peak end point may be defined as either 2.5 standard deviations, or a slope up to another peak, which ever comes first. The threshold definitions given above are examples. Many other threshold definitions may be used. In some embodiments, one or more threshold definitions may be received from a user and the image-editing application may be configured to receive user input specifying the threshold.

The method described above may be used to determine one or more prominent color hue value ranges for one image. For example, after determining the range associated with one prominent peak in the histogram, the image-editing application may determine other prominent peaks and calculate their associated ranges. This gives the user the opportunity to replace more than one prominent color range in a single image.

As shown in block 130, the image-editing application may determine replacement color values according to the prominent color hue value range within the image. In some embodiments, replacement color hue values may be determined at intervals across the entire spectrum of possible color hue values. For example, if a prominent color hue value range is primarily red, in an HSV color space, the image-editing application may determine one or more replacement color hue value ranges within the HSV color space at various intervals across the HSV spectrum (e.g., green, blue, yellow and violet). In the example described above, the image-editing application may display thumbnail images, each replacing the red color hue value range with the determined replacement color hue value range. The thumbnail images may present previews (for comparison purposes) of what the main image would look like if the selected colors were replaced. The image-editing application may receive input selecting a particular thumbnail image and the image-editing application may replace the prominent color hue value range with the replacement color hue value range in the original image. In some cases, after determining the replacement color values, the image-editing application may convert the image from a color space that includes a hue value (e.g., HSV) back to the original color space (e.g., RGB) in order to display the image on a display device. In other cases, the image may be displayed in the color space that includes a hue value (e.g., HSV).

In some embodiments, the image-editing application may convert the main image from color to black and white, except for the color hue value range selected for replacement. In other words, the parts of the image that include the colors selected for replacement may remain in color while the remaining parts of the image may be converted to black and white. (See FIG. 5.) This may better define the effect of the replacement colors for the user to view.

Figure 2A:
FIG. 2A is an illustration of a digital image, according to some embodiments.
Figure 2B:
FIG. 2B is an illustration of a digital image with replacement color values, according to some embodiments.

FIG. 2A is an illustration of an image, according to one embodiment. FIG. 2B is an illustration of an image with replacement color values for a selected color hue value range, according to one embodiment. The transformed image in FIG. 2B is one example of the results of an image transformation according to the methods and systems described herein.

Figure 3:
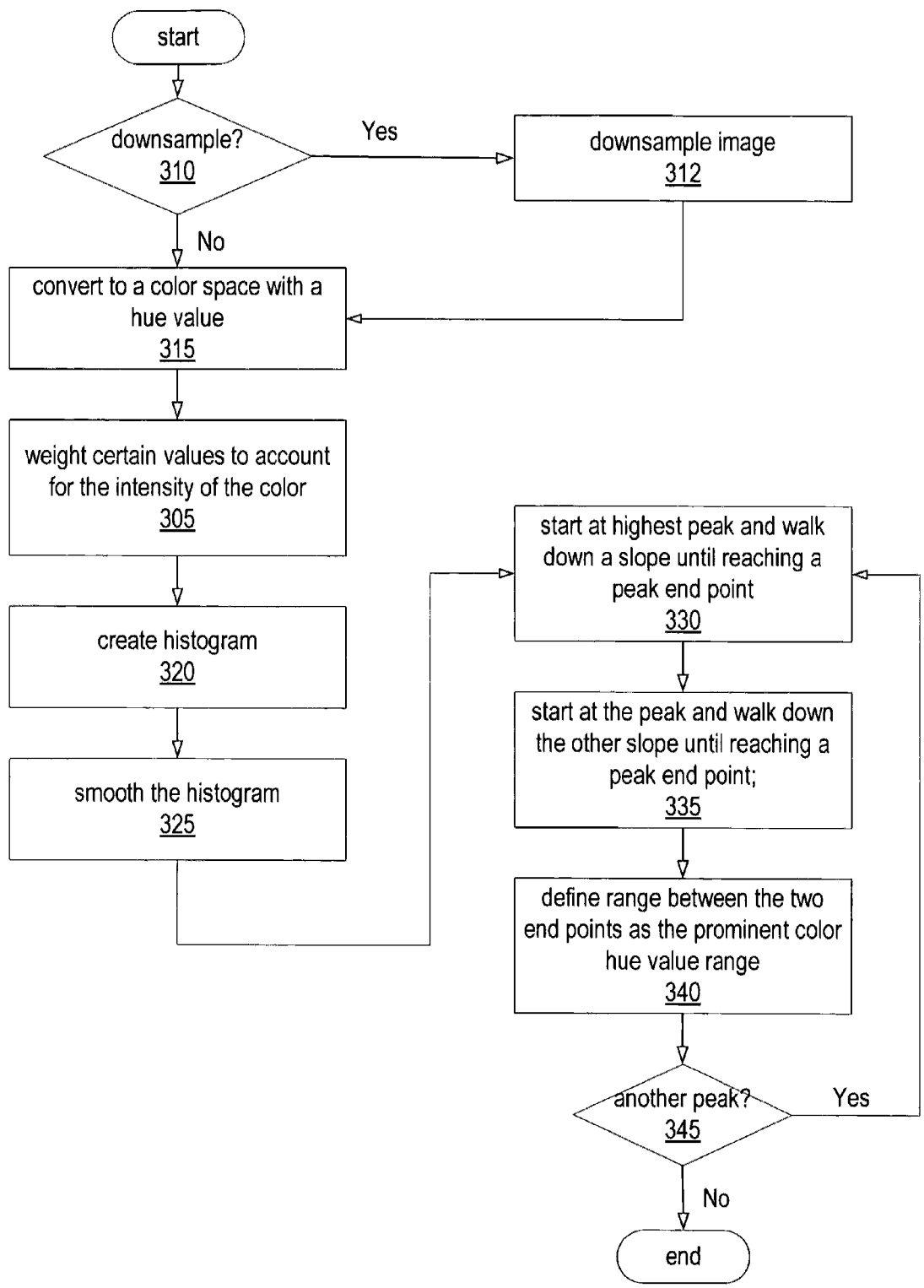
FIG. 3 is a flow diagram illustrating an image-editing application creating a hue histogram and analyzing the histogram to determine prominent color hue value ranges, according to some embodiments.

FIG. 3 is a flow diagram illustrating an image-editing application creating a color hue histogram, according to some embodiments. The color hue histogram may be created by the image-editing application from the image information. As shown in blocks 310 and 312, in some embodiments, prior to creating the histogram, the image-editing application may downsample the image to increase performance, (i.e., increase the speed with which the image is analyzed). The histogram may be created from the downsampled image of the original image. In other embodiments, the image may not be downsampled and the histogram may be created from the original image.

As shown in block 315, prior to creating the histogram, the image may be converted from a color space that does not include a hue value to another color space that includes a hue value. For example, the image may be converted from an RGB color space to an HSV color space. After creating the histogram and determining the replacement colors for the image, the image may be converted back to the original color space (e.g., RGB) in order to display the image on a display device.

As shown in block 305, the image-editing application may weight certain values in the HSV color model during the calculation of the histogram to account for the intensity of the color. Weighting may take into consideration saturation and brightness. For example, those colors with more saturation and brightness may be weighted heavier than colors that are muted or dark. In some embodiments, muted or dark colors may be disregarded. Any suitable weighting technique may be utilized.

Figure 4A:
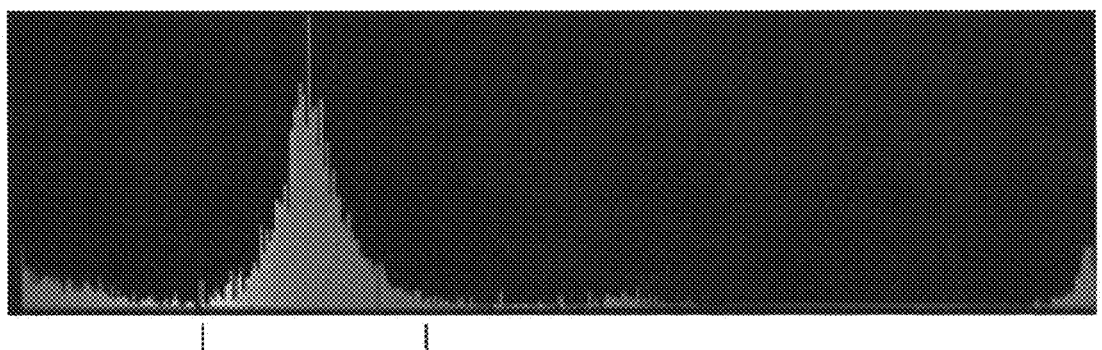
FIG. 4A is an illustration of a color hue histogram, according to some embodiments.

As shown in block 320, the image-editing application may create the color hue histogram (e.g., from the original image or the downsampled image). The color hue histogram may be constructed by counting the number of pixels for each color hue value. FIG. 4A illustrates an example of a color hue value histogram. The area illustrated at element 410A is a prominent color hue value range in the HSV color space.

Figure 4B:
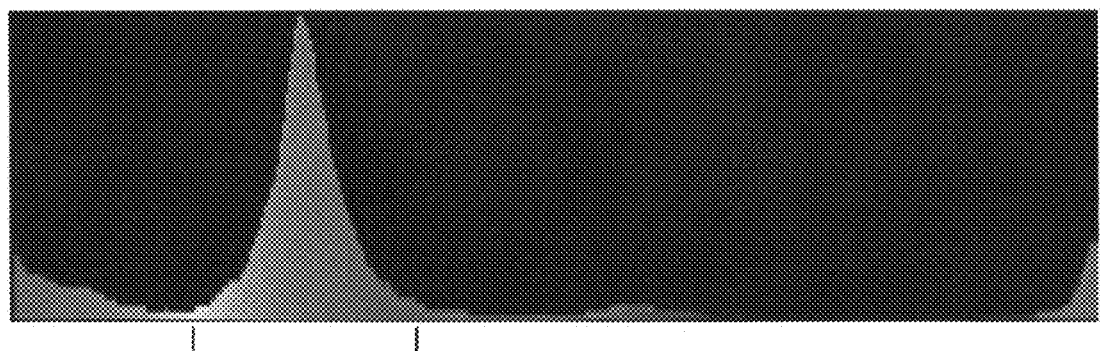
FIG. 4B is an illustration of a color hue histogram after executing an technique to make the peaks and valleys of the histogram appear smooth and more distinct, according to some embodiments.

As shown in block 325, in one embodiment, after creating the initial histogram, the histogram may be manipulated to make the peaks and valleys more distinct (e.g., making the histogram appear smoothed and continuous). For example, the histogram may be manipulated with a Gaussian kernel. Other smoothing techniques may be utilized. In some embodiments, no smoothing technique is utilized. FIG. 4B illustrates the histogram of FIG. 4A after executing the Gaussian kernel. Note that the peaks and valleys shown at item 410A in FIG. 4A appear smooth as shown at element 410B in FIG. 4B (e.g., after manipulating the data using the Gaussian kernel).

The histogram may be analyzed to determine a range of color hue values associated with a particular peak. As shown at block 330, the image-editing application may identify a peak in the histogram. The image-editing application may start at the highest peak in the histogram not already identified and walk down one slope until it finds an end point of the peak. Subsequently, as shown at block 335, the image-editing application may start at the same peak and walk down the other slope until reaching a second end point for the peak. The range between the two peak end points may be defined as a prominent color hue range, as shown in block 340.

As described above, many techniques may be used to define an end point for a peak. In some embodiments image-editing application may calculate a mean, variance and standard deviation and utilize a calculation of these values to determine one or more threshold used to determine a peak. For example, an outlier threshold may be defined as 2.5 standard deviations from the peak. The process may traverse down the slope of the peak until reaching the outlier threshold which may signal an end point of the peak.

The process may also distinguish between adjacent peaks. For example, while traversing down the slope of the peak, a rise in the histogram may be detected before reaching the outlier threshold. A new-peak base threshold and a new-peak height threshold may be defined to determine if the rise in the histogram is a new peak, or just part of the current peak. The new-peak base threshold indicates a point that is low enough on the slope of the current peak that if a rise is detected it may be the start of a new peak as opposed to part of the current peak. The new-peak height threshold indicates a height that the rise in the histogram must reach to be considered part of a new peak as opposed to a foothill of the current peak. The new-peak base threshold is less than or equal to the outlier threshold. For example, in one embodiment, the outlier threshold may be defined as 2.5 standard deviations from the peak and the new-peak base threshold as 1.75 standard deviations from the peak. In some embodiments, the new-peak base threshold may be defined as a percentage of the outlier threshold. In some embodiments, the new-peak height threshold may be defined as a percentage of the height of the current peak, e.g. 50%. While traversing down the slope of the current peak, if a rise in the histogram is detected prior to reaching the new-peak base threshold, the rise is ignored as part of the current peak. If a rise in the histogram is detected after reaching the new-peak threshold, then if the rise continues to the new-peak height threshold, the process determines that the rise signaled the beginning of a new peak. In this case, the end point for the current peak is set at where the rise began. If the rise does not reach the new-peak height threshold, then the rise is considered to be just a foothill of the current peak and the process continues until the outlier threshold is reached or until the start of a true new peak is reached. In some embodiments, the outlier threshold, new-peak base threshold, and/or new-peak height threshold may be user-configurable within the image editing application.

Figure 4C:
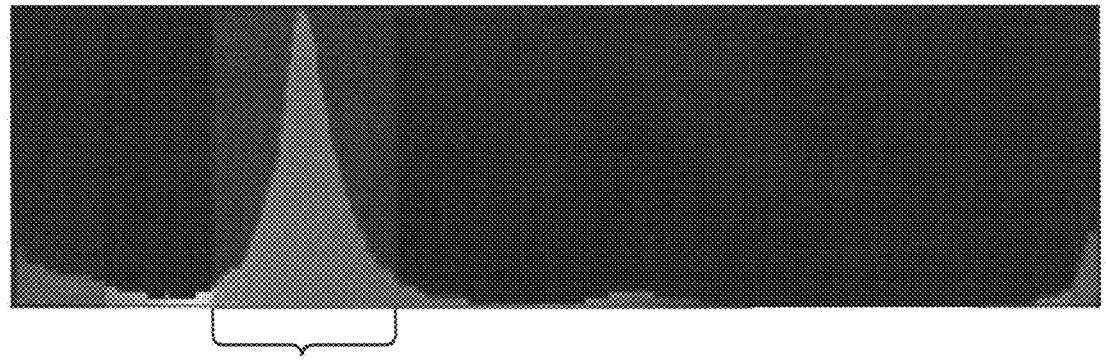
FIG. 4C is a diagram of a hue histogram illustrating a color hue value range, according to some embodiments.

As described above, the area between the two peak end points defines a prominent color hue value range. Item 410C in FIG. 4C depicts a prominent color hue value range. Note the vertical shaded area corresponding to the area between thresholds shown at item 410C. This area depicts the prominent color hue value range.

In some embodiments, there may be more than one peak in a histogram, meaning there is more than one prominent color hue value range in the image. As shown in block 345, the image-editing application may determine additional prominent color hue value ranges using the same technique as described above. In some embodiments, a copy of the original histogram may be generated. The copy may be referred to as the SuppressCopy. The SuppressCopy is used to keep track of areas that have already been processed. As each peak is found the peak's range is saved and suppressed in the SuppressCopy histogram so that that the range of the suppressed peak is not again traversed by the peak identification process. The above peak identification process may be applied iteratively until all peaks are identified.

Figure 5:
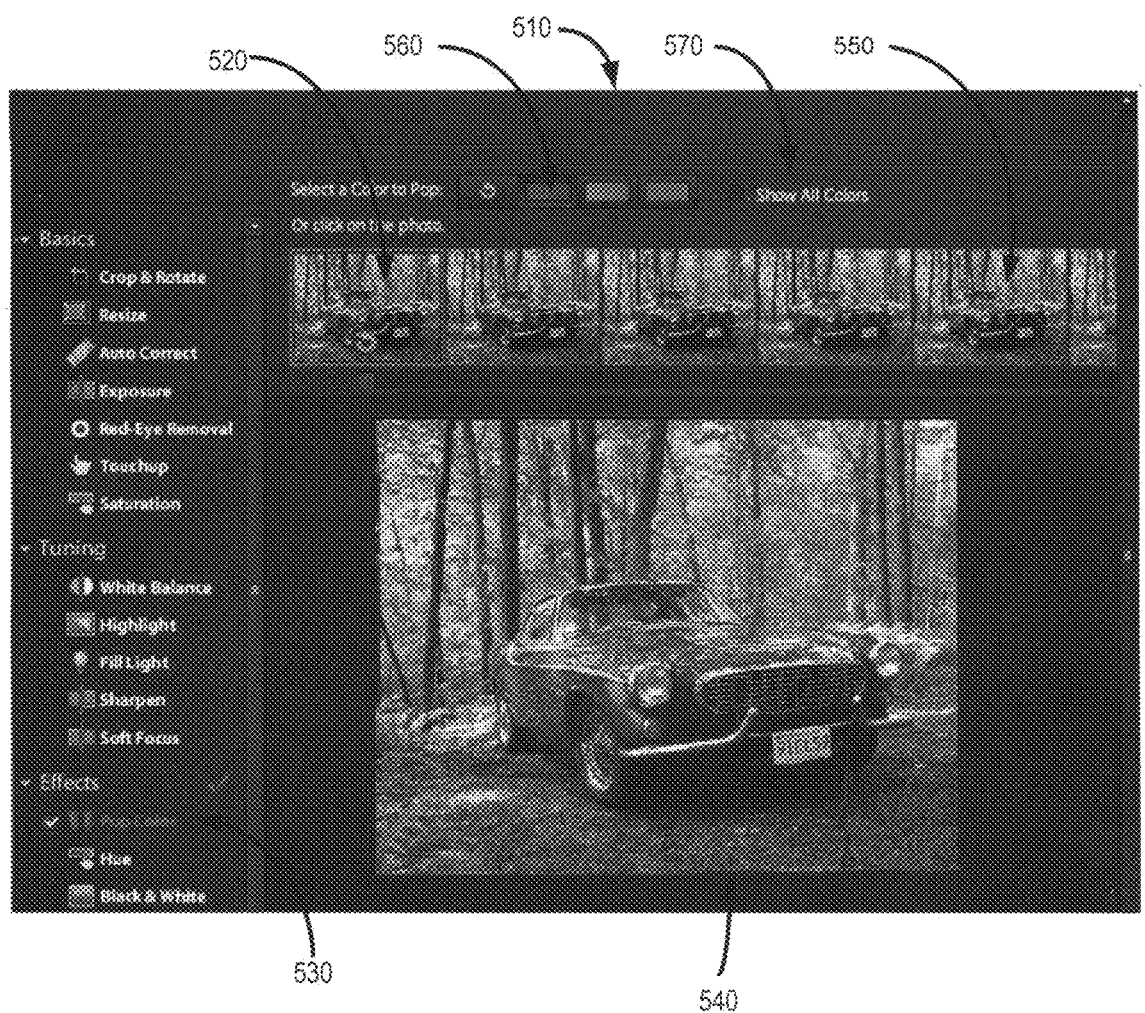
FIG. 5 is an illustration of a image-editing application user interface, according to some embodiments.

FIG. 5 is an illustration a image-editing application user interface, according to some embodiments. The image-editing application may display a user interface as shown at item 510. The user interface illustration provided herein is an example. Arrangements of the displayed objects in the figures are provided for description purposes only and are not meant to limit the design of the user interface or the manner in which objects are displayed. Items in the figures may be rearranged or omitted altogether.

The image-editing application may include one or more menu items for various image transformation operations. Example transformations include cropping, auto-correcting, touchup, saturation, pop-color, hue, black and white effects, tints and distortions. Many other transformations are possible. Each menu item may be associated with one or more transformation operations that may be executed on image data. Item 530 illustrates the currently selected transformation is "Pop-Color" or another suitable term for a color replacement operation. In various embodiments "Pop-Color" may be referred to as "Change Color" or "Replace Color". The Pop-Color operation may transform the color of certain pixels displaying a color within a certain range to replacement colors within a replacement range.

Item 560 illustrates a prominent color range found for the image displayed at item 540. The illustrated color range may correspond to a color hue value range found when the image-editing application analyzed the image histogram for the image displayed at item 540.

The image-editing application may display a main image, as shown at item 540. In some embodiments, image 540 may be displayed in black and white, except for colors in the selected color range (e.g., item 560), which may be displayed in color.

The image-editing application may display one or more thumbnail images in a thumbnail image control. For example, thumbnail images are shown between item 520 and item 550. Each thumbnail image may be displayed with a different replacement color for the selected range (e.g., item 560), giving the user a preview of what image 540 would look like if the replacement color associated with the thumbnail image were selected.

Figure 6:
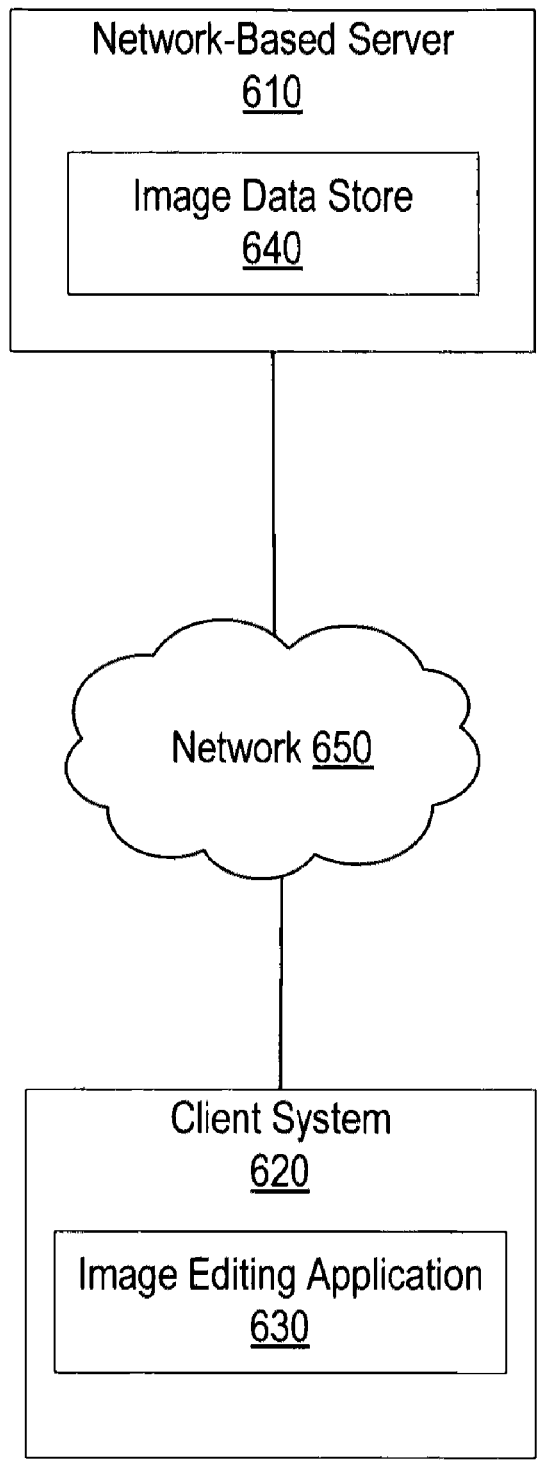
FIG. 6 is a block diagram illustrating a system for replacing color ranges, according to some embodiments.

FIG. 6 is a block diagram illustrating an image-editing application 630 configured to operate as described above for FIGS. 1-5, according to some embodiments. A client system 620 may include an image-editing application 630. Client system 620 may be implemented as a computing device configured to execute program instructions and display images on a display device. Client system 620 may be implemented as a laptop computer, desktop computer, server, tablet computing device, video game console, personal digital assistant (PDA), digital camera or cell phone. Other computing devices have been contemplated.

Client system 620 may be configured with an operating system. The operating system may be configured to interact with image editing application 630 in order to manage resources such as exchanging data with digital cameras, receiving user input, managing files (e.g., digital images) and communicating with other computing devices (e.g., network-based server 610) via network 650. Example operating system implementations include Linux, Mac OS X™, Microsoft™ Windows™, and Solaris™. Other operating systems have been contemplated.

In some embodiments, image-editing application 630 may be configured to edit digital images. Example implementations of image-editing application 630 include Adobe Photoshop™ and Adobe Photoshop Express™. Image-editing application 630 may apply various transformation operations to digital image data in order to change the appearance of the digital image.

Image-editing application 630 may be configured to communicate with network-based server 610 utilizing network 650. For example, image-editing application 630 may be configured to upload and download images to image data store 640 via network-based server 610.

Image-editing application 630 may be integrated with, or be part of a network-enabled application (e.g., web browser). For example, a network-enabled application may be integrated with Adobe Flash™, an Active-X™ component, or another suitable component. In some embodiments, image-editing application 630 may be written in a scripting language and compiled into byte code. Image-editing application 630 may be downloaded from a web site (e.g., embedded in a web page) and invoked by client system 620 when received.

In some embodiments, image-editing application 630 may be written in a procedural language, such as C or C++ and compiled into an executable program. Image editing application 630 may be written in an object oriented language, such as Java™ or C#™ and execute in conjunction with a virtual machine (Java Virtual Machine (JVM)) or a framework, such as .NET or J2EE.

Image-editing application 630 may read and write image data locally on client system 620, such as to and from a storage device. Storage device implementations may include one or more disk drives or non-volatile memory storage, such as FLASH memory. In some embodiments, image-editing application 630 may transfer images to and from image data store 640, located on network-based server 610. Image-editing application 630 may retrieve images from a camera device connected directly to client system 620. In other cases image-editing application 630 may be integrated with a camera device and images may be loaded directly into image editing application 130.

In various embodiments, network 650 may be configured to allow data to be exchanged between client system 620 and other devices connected to network 650, such as network-based server 610. Network 650 may correspond to various methods of communication between entities and may include, but is not limited to communication via telephone, fax, email, messages (e.g., instant messaging), voice messages, and electronic documents (e.g., web page, email or file transfers). In general, network 650 may represent any method that one entity may utilize to communicate with another entity. While network 650 may be illustrated in a generalized manner, one of ordinary skill in the art will recognize that network 650 is meant to be representative of a complete communication path between the entities depicted in FIG. 6 with a specific type of communication channel. For example, network 650 may represent one or more communications channels and may include one or more telecommunications networks as well as various data networks. Network 650 may include network devices such as circuits, switches, routers, hubs and/or gateways. Network 650 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol. Data may be transmitted on network 650 using Hyper Text Transport Protocol (HTTP), Secure Hyper Text Transport Protocol (HTTPS), Secure Socket Layer Protocol (SSL), Transport Layer Security Protocol (TLS) or another suitable network transport protocol. In various embodiments, the services described herein may utilize any suitable compression protocol or cryptographic protocol when communicating over network 650.

Network-based server 610 may be implemented as any computing system configured to connect to network 650 and communicate with client system 620. In some embodiments, network-based server 610 may be implemented as a web server. Network-based server 610 may service requests from one or more client systems 120. Network-based server 610 may be configured to listen on a port (e.g., port 80) waiting for client system 110 to send a request message, such as for an image file stored in image data store 640. When network-based server 610 receives a request, it may be configured to fetch content (e.g., web content or image file) and forward the content to client system 620. Network-based server 610 may be implemented as one or more physical systems connected to one or more storage devices. Network-based server 610 may be configured to run special web server software to service client system 620 requests. Examples include Microsoft™ Internet Information Systems™ and Apache™. Other server host application software is possible. In some embodiments, network-based server 610 may provide web services or be implemented as an application server.

Figure 7:
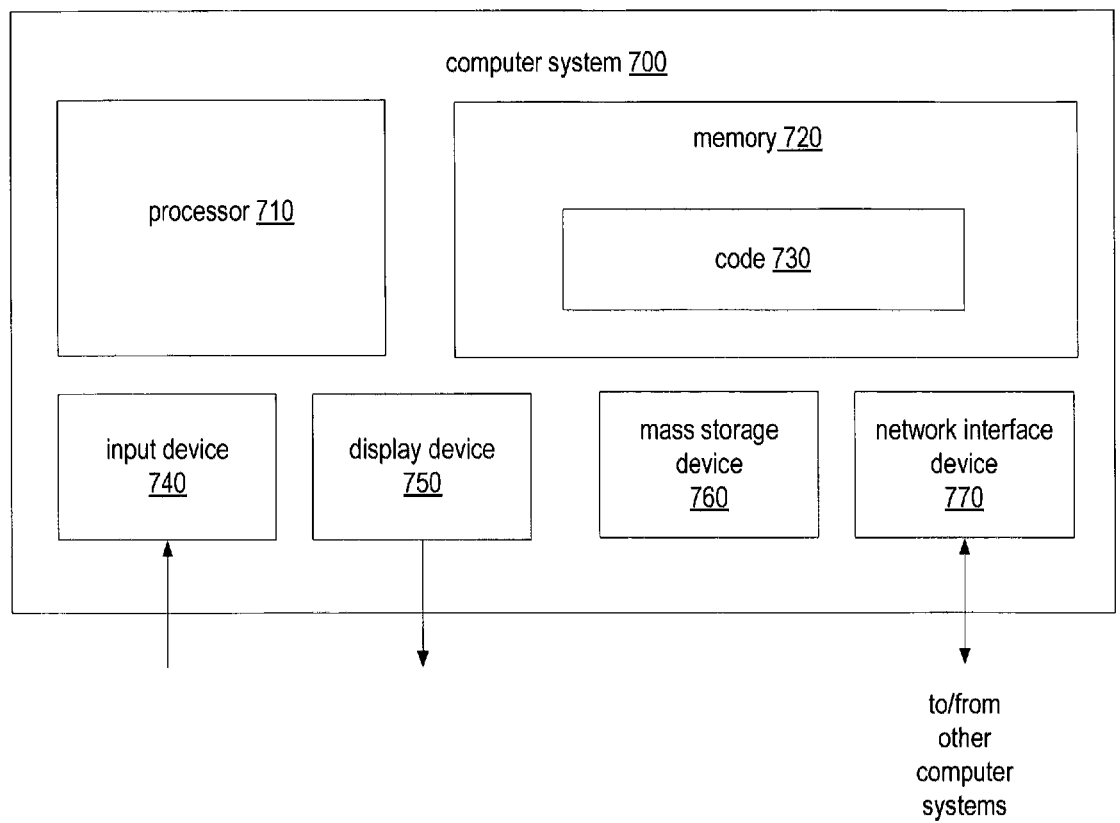
FIG. 7 is a block diagram of a computing device, according to some embodiments.

FIG. 7 is a block diagram illustrating a computing device, according to an embodiment. Various components of embodiments of client system 620 and network-based server 610 and nodes, etc., as described herein, may be executed on one or more computer systems, which may interact with various other devices. One such computer system is illustrated by FIG. 7. In the illustrated embodiment, computer system 700 includes one or more processors 710 coupled to a system memory 720. Computer system 700 further includes a network interface 770 and one or more input/output devices 740/750, such as a cursor control device, keyboard, audio device and display device 750. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 710 may commonly, but not necessarily, implement the same ISA.

System memory 720 may be configured to store program instructions 730 and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for image-editing application 630, are shown stored within system memory 720 as program instructions 730 and data storage 760, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 700. Program instructions and data stored via a computer-accessible medium may be transmitted by transmission media or signals such as electrical, electromagnetic, or digital signals, which may be provided via a communication medium such as a network and/or a wireless link, such as may be implemented via network interface 770.

Network interface 770 may be configured to allow data to be exchanged between computer system 700 and other devices attached to a network, such as other computer systems, or between nodes of computer system 700. In various embodiments, network interface 770 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 740 and 750 respectively, may in some embodiments include one or more display terminals, keyboards, keypads, touchpads, scanning devices, voice or optical recognition devices, or any other devices suitable for entering or retrieving data by one or more computer system 700. Multiple input/output devices 740 and 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 770.

Memory 720 may include program instructions 730, configured to implement at least a portion of embodiments of the image-editing application 630 as described herein, and data storage 760, comprising various documents, tables, databases, etc. accessible by program instructions 730. In one embodiment, program instructions 730 may include software elements of the image-editing application 630 illustrated in the Figures, and data storage 760 may include data used in embodiments of image-editing application 630. In other embodiments, different software elements and data may be included. Program instructions and/or data may be stored, for example, on various types of memory including hard disks.

Those skilled in the art will appreciate that computer system 700 is merely illustrative and is not intended to limit the scope of the image-editing application 630 as described herein. In particular, the computer system and devices may include any combination of hardware or software that can perform the indicated functions, including computers, network devices, interne appliances, PDAs, mobile phones, pagers, etc. Computer system 700 may also be connected to other devices that are not illustrated, or instead may operate as a stand-alone system. In addition, the functionality provided by the illustrated image-editing application 630 may in some embodiments be combined in fewer image-editing components or distributed in additional image-editing components.

Similarly, in some embodiments, the functionality of some of the illustrated image-editing application components 130 may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software image-editing application components 130 may execute in memory on another device and communicate with the illustrated computer system via inter-computer communication. Some or all of the image-editing application 630 or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   creating a histogram of an image, wherein the histogram comprises tabulated frequencies of color hue values within the image;
   determining a prominent color hue value range within the image according to the histogram, wherein the prominent color hue value range is associated to a particular group of pixels displayed on a display device;
   determining a replacement color hue value range corresponding to the prominent color hue value range within the image;
   replacing the prominent color hue value range in the image with the replacement color hue value range, wherein the color hue value for each pixel within the particular group of pixels is changed from a prominent color hue value within the prominent color hue value range to a corresponding replacement color hue value within the replacement color hue value range.

2. The computer-implemented method of claim 1, further comprising:
   transforming the image black and white except for the particular group of pixels, wherein the particular group of pixels associated to the prominent color hue value range remain in color.

3. The computer-implemented method of claim 1, further comprising:
   downsampling the image; and
   creating the histogram using the downsampled image.

4. The computer-implemented method of claim 1, further comprising, prior to creating the histogram of the image, converting the image from a color space that does not include a hue value to a color space that includes a hue value.

5. The computer-implemented method of claim 4, wherein said converting the image comprises converting the image from a Red, Green, Blue (RGB) color space to a Hue, Saturation, Value (HSV) color space.

6. The computer-implemented method of claim 1, wherein subsequent to replacing the prominent color hue value range in the image with the replacement color hue value range, converting the image to a color space that can be displayed on the display device.

7. The computer-implemented method of claim 1, further comprising smoothing the histogram using a smoothing technique to make peaks and valleys of the histogram more distinct.

8. The computer-implemented method of claim 7, wherein said smoothing technique comprises executing a Gaussian function on the histogram.

9. The computer-implemented method of claim 1, further comprising, determining a plurality of prominent peaks within the histogram.

10. The computer-implemented method of claim 9, further comprising:
    for each of the prominent peaks in the histogram, determining a color hue value range associated with the peak.

11. The computer-implemented method of claim 10, wherein said determining the color hue value range associated with the peak comprises:
    starting at a peak and traversing down a slope to a first peak end point; and
    subsequently, starting at said peak and traversing the other direction down a second slope to a second peak end point, wherein the range between the first peak end point and the second peak end point comprises the color hue value range.

12. A system, comprising:
    one or more processors;
    a memory coupled to one or more processors, wherein the memory stores program instructions executable by the one or more processors to implement image-editing application, wherein said image-editing application is configured to:
       create a histogram of an image, wherein the histogram comprises tabulated frequencies of color hue values within the image;
       determine a prominent color hue value range within the image according to the histogram, wherein the prominent color hue value range is associated to a particular group of pixels displayed on a display device;

determine a replacement color hue value range corresponding to the prominent color hue value range within the image;

replace the prominent color hue value range in the image with the replacement color hue value range, wherein the color hue value for each pixel within the particular group of pixels is changed from a prominent color hue value within the prominent color hue value range to a corresponding replacement color hue value within the replacement color hue value range.

13. The system recited in claim 12, wherein the image-editing application is further configured to:
transform the image black and white except for the particular group of pixels, wherein the particular group of pixels associated to the prominent color hue value range remain in color.

14. The system recited in claim 12, wherein the image-editing application is further configured to:
downsample the image; and
create the histogram using the downsampled image.

15. The system recited in claim 12, wherein the image-editing application is further configured to: prior to creating the histogram of the image, convert the image from a color space that does not include a hue value to a color space that includes a hue value.

16. The system claim 15, wherein said converting the image comprises converting the image from a Red, Green, Blue (RGB) color space to a Hue, Saturation, Value (HSV) color space.

17. The system as recited in claim 12, wherein subsequent to replacing the prominent color hue value range in the image with the replacement color hue value range, the image-editing application is further configured to convert the image to a color space that can be displayed on the display device.

18. The system as recited in claim 12, wherein the image-editing application is further configured to smooth the histogram using a smoothing technique to make peaks and valleys of the histogram more distinct.

19. The system as recited in claim 18, wherein said smoothing technique comprises executing a Gaussian function on the histogram.

20. The system as recited in claim 12, wherein the image-editing application is further configured to determine a plurality of prominent peaks within the histogram.

21. The system as recited in claim 20, wherein the image-editing application is further configured to:
for each of the prominent peaks in the histogram, determine a color hue value range associated with the peak.

22. The system as recited in claim 21, wherein said determining the color hue value range associated with the peak comprises:
start at a peak and traverse down a slope to a first peak end point; and
subsequently, start at said peak and traverse the other direction down a second slope to a second peak end point, wherein the range between the first peak end point and the second peak end point comprises the color hue value range.

23. A computer-accessible storage medium storing program instructions computer-executable to implement an image-editing application, wherein the image-editing application is configured to:
create a histogram of an image, wherein the histogram comprises tabulated frequencies of color hue values within the image;
determine a prominent color hue value range within the image according to the histogram, wherein the prominent color hue value range is associated to a particular group of pixels displayed on a display device;
determine a replacement color hue value range corresponding to the prominent color hue value range within the image;
replace the prominent color hue value range in the image with the replacement color hue value range, wherein the color hue value for each pixel within the particular group of pixels is changed from a prominent color hue value within the prominent color hue value range to a corresponding replacement color hue value within the replacement color hue value range.

24. The computer-accessible storage medium as recited in claim 23, wherein the image-editing application is further configured to:
transform the image black and white except for the particular group of pixels, wherein the particular group of pixels associated to the prominent color hue value range remain in color.

25. The computer-accessible storage medium as recited in claim 23, wherein the image-editing application is further configured to:
downsample the image; and
create the histogram using the downsampled image.

26. The computer-accessible storage medium as recited in claim 23, wherein the image-editing application is further configured to: prior to creating the histogram of the image, convert the image from a color space that does not include a hue value to a color space that includes a hue value.

27. The computer-accessible storage medium as recited in claim 26, wherein said converting the image comprises converting the image from a Red, Green, Blue (RGB) color space to a Hue, Saturation, Value (HSV) color space.

28. The computer-accessible storage medium as recited in claim 23, wherein subsequent to replacing the prominent color hue value range in the image with the replacement color hue value range, the image-editing application is further configured to convert the image to a color space that can be displayed on the display device.

29. The computer-accessible storage medium as recited in claim 23, wherein the image-editing application is further configured to smooth the histogram using a smoothing technique to make peaks and valleys of the histogram more distinct.

30. The computer-accessible storage medium as recited in claim 29, wherein said smoothing technique comprises executing a Gaussian function on the histogram.

31. The computer-accessible storage medium as recited in claim 23, wherein the image-editing application is further configured to determine a plurality of prominent peaks within the histogram.

32. The computer-accessible storage medium as recited in claim 31, wherein the image-editing application is further configured to:
for each of the prominent peaks in the histogram, determine a color hue value range associated with the peak.

33. The computer-accessible storage medium as recited in claim 32, wherein said determining the color hue value range associated with the peak comprises:
start at a peak and traverse down a slope to a first peak end point; and
subsequently, start at said peak and traverse the other direction down a second slope to a second peak end point, wherein the range between the first peak end point and the second peak end point comprises the color hue value range.

* * * * *